United States Patent
Morrison et al.

(10) Patent No.: US 6,776,562 B2
(45) Date of Patent: Aug. 17, 2004

(54) POWER FEED ALINE-A-DRILL ATTACHMENT

(75) Inventors: James L. Morrison, O'Fallon, MO (US); Thomas O. Blankenship, St. Charles, MO (US); David L. Fritsche, Foristell, MO (US); Jimmy Williams, Jr., Ballwin, MO (US)

(73) Assignee: The Boeing Company, Chicago, IL (US)

( * ) Notice: Subject to any disclaimer, the term of this patent is extended or adjusted under 35 U.S.C. 154(b) by 209 days.

(21) Appl. No.: 09/949,600

(22) Filed: Sep. 10, 2001

(65) Prior Publication Data

US 2003/0049082 A1 Mar. 13, 2003

(51) Int. Cl.$^7$ .............................................. B23B 45/00
(52) U.S. Cl. ........................... 408/56; 408/97; 408/130; 408/712
(58) Field of Search ............................. 408/56, 61, 97, 408/110, 111, 113, 114, 124, 130, 17, 712, 112, 702

(56) References Cited

U.S. PATENT DOCUMENTS

| | | | | |
|---|---|---|---|---|
| 2,604,759 A | * | 7/1952 | Smith | 173/155 |
| 2,854,870 A | * | 10/1958 | Chaffee et al. | 173/8 |
| 3,287,996 A | * | 11/1966 | Doyle | 408/59 |
| 3,301,333 A | * | 1/1967 | Linsker | 173/19 |
| 3,318,391 A | * | 5/1967 | Linsker | 173/19 |
| 3,547,350 A | * | 12/1970 | Marcoux | 239/308 |
| 4,123,188 A | * | 10/1978 | Deremo et al. | 408/17 |
| 4,961,675 A | * | 10/1990 | Stewart | 408/1 R |
| 5,071,293 A | * | 12/1991 | Wells | 408/112 |
| 5,295,770 A | * | 3/1994 | Pennison et al. | 408/6 |

OTHER PUBLICATIONS

Cooper Power Tools Manuel, pp. 95–98.

* cited by examiner

*Primary Examiner*—Daniel W. Howell
(74) *Attorney, Agent, or Firm*—Harness Dickey & Pierce P.L.C.

(57) ABSTRACT

A power feed attachment that has a coupling structure to couple it to a hand held drill. A double-acting cylinder, which has a piston and a rod, and is fixedly coupled to the coupling structure. A two-position valve assembly is configured for directing a pressurized fluid to the double-acting cylinder. When the two-position valve assembly is in a first position is directs a fluid to a first side of the piston moving the piston to a first position. When the two-position valve assembly is in the second position it directs the pressurized fluid to a second side of the piston to move the piston to a second position. An arm is coupled to the piston. A control mechanism having a housing and a control rod, wherein the control rod is movable within the housing of the control mechanism between an extended position and a retracted position. The control mechanism has a biasing device for biasing the control rod toward the extended position, the control rod being configured to contact the arm to resist movement of the piston toward the second position to thereby control a rate by which the piston is advanced toward the second position. The assembly may also include a four-way two position air piloted valve to control the flow of a fluid to the arm.

20 Claims, 6 Drawing Sheets

POWER FEED ALINE-A-DRILL ATTACHMENT

FIELD OF THE INVENTION

The present invention relates to power feed attachments for drills and more specifically relates to pneumatically powered feed attachments for drills actuated upon activation of the drill.

BACKGROUND OF THE INVENTION

It is generally known in the art to provide a power feed or drive attachment for a drill motor. A power feed attachment allows a tool bit, for example a drill bit or countersink, that is coupled to a drill to be driven forward without manual power from the user of the tool. As such, the power feed attachment precisely controls the forward feed rate of the tool bit while the remainder of the drill is maintained in a stationary position relative to a work piece.

Generally, however, known power feed attachments have several disadvantages. One main disadvantage of commonly known power feed attachments is the fact that they are return driven by springs. The tool is driven forward by any means and is returned to its originating position by a spring. After many uses, the spring tends to become weak or bind due to dirt and foreign material entering into the return mechanism. The binding of the spring reduces the return power or inhibits return of the power feed attachment. Therefore, tools having these power feed attachments must periodically be removed from their production area to permit their power feed attachment to be repaired and/or cleaned so that the tool bit will return properly at the end of the feed cycle.

Additionally, many power feed attachments are coupled to their drills such that the tool's overall center of gravity is located too far to the front of the power tool, giving the tool an unbalanced, nose-heavy feel. Therefore, when an operator attempts to use the tool strain is placed on the operator's hands, wrists, and arms during operation making the tool uncomfortable to use. Furthermore, the unbalanced nature of the tool tends to destabilize the tool and inhibits the precision with which the tool may be operated.

Furthermore, many power feed attachments add significant additional length to the power tool which tends to reduce its versatility by rendering the tool incapable of use in relatively small places or in awkward positions. With the increased length of the tool, there is no way to mount the tool in small places to allow the power feed attachment to work.

Therefore, there has been a long felt need to provide a power feed attachment that reduces the above-mentioned disadvantages among others. In particular, a power feed attachment would generally be more useful if it were compact so that a tool may be used in many different locations, including small or cramped ones, and in awkward positions. Furthermore, it is desirable to include a power feed attachment that does not place the center of gravity away from the user's hands or the grip of the power tool. Therefore, the tool would be easier to maneuver and its position more accurately maintained relative to the work piece during the tool's operation. Finally, it has generally been felt that a simple and highly efficient power feed attachment is needed. Also, a power feed attachment that does not require special parts or mechanisms thereby reducing cost and repair time. One where there are fewer parts that require maintenance and a power source that can easily overpower any foreign material or grime that may build up within the mechanism with general use. The power feed attachment would also need to be driven and retract upon a signal from the tool depending upon whether it is being driven or not.

SUMMARY OF THE INVENTION

The present invention provides a power feed attachment for a drill motor which is designed so that the drill motor may be used in numerous orientations. The compactness of the attachment also allows it to be used in tight places where large tools cannot easily access. The present invention, however, does not sacrifice power, but rather increases return power over other attachments.

Additionally, the present invention provides a power feed attachment that has a simplified and more durable mechanism. Maintenance and downtime may be reduced due to the long-term durability of the present invention. Additionally, the mechanism of the present invention does not use parts or systems that are easily inhibited by the dust, dirt, chips, and grime that is encountered in general shop or working conditions. The system of the present invention provides enough power to the power feed attachment that foreign material introduced to the apparatus will not effect the operation of the present invention.

The power feed attachment of the present invention allows for very precisely drilled holes and countersink tolerances. The present invention provides systems that finely control the feed rate of the power feed attachment thereby allowing precise drill holes and countersinks without a great deal of effort from the operator of the power tool.

Additionally, the mechanism of the present invention is easily maintained and serviced. Rather than requiring numerous intricate parts, the present invention provides an apparatus which is produced from several large easily replaceable parts which comprise the system of the present invention. Therefore, even if maintenance is required on the present invention, the maintenance is easily performed and advantageous to a continuation of the production schedule.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
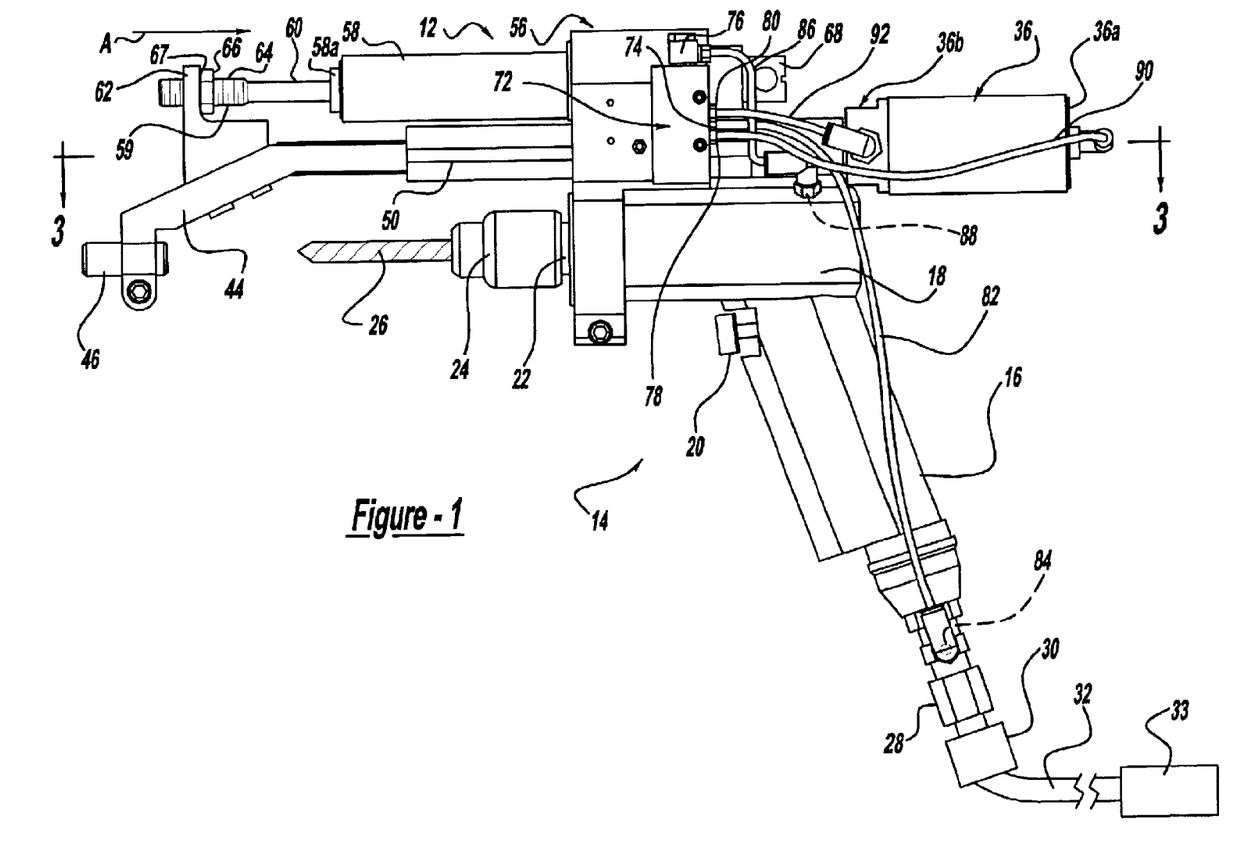
FIG. 1 is a side elevational view of a power tool having a power feed attachment disposed in an extended position and constructed in accordance with the teachings of a first embodiment of the present invention.

With reference to FIG. 1 of the drawings, a power tool assembly 10 is illustrated to include a power feed attachment 12, which is constructed in accordance with the teachings of the present invention, and a power tool, which, in the example provided, is a drill motor 14. The drill motor 14 generally includes a pistol grip 16 affixed to a motor casing 18. Motor casing 18 encloses a motor (not shown), which is activated by pressing trigger 20. Activation of the motor conventionally rotates the spindle 22, and the chuck 24, and, when affixed within the chuck 24, a tool bit 26. Tool bit 26 may be any appropriate tool bit 26 including a drill bit or a countersink bit. Affixed to the pistol grip 16 and extending from an end opposite motor casing 18 is a male coupling 28 which connects to a female coupling 30 of a fluid supply hose 32 extending from a power source 33. In particular, the fluid supplied to the drill motor 14 is compressed air.

With additional reference to FIGS. 1–4, the power feed attachment 12 is shown to generally include a double acting air cylinder 36. Double acting air cylinder 36 may be any conventional double acting air cylinder, such as a 01 Series Micro-Air Cylinder, Part No. 0118-5029-010, manufactured by the ARO Corporation. Double acting air cylinder 36 includes an air driven piston 38, having a first side 38a and a second side 38b, and a first piston rod 40, coupled to air driven piston 38, that extends from a front portion 36a of double acting air cylinder 36. First piston rod 40 engages an intermediate or connection member 42 through a threaded portion 43 at a forward end 40a of first piston rod 40 and a rearward end 42a of connection member 42. Furthermore, a forward end 42b of connection member 42 includes threads 42c which engage a forward or guide arm 44 of power feed attachment 12. Affixed to guide arm 44 is a bushing 46. Guide arm 44 and bushing 46 act to guide tool bit 26 during the actuation of drill motor 14. Bushing 46 may be affixed to guide arm 44 through any suitable means and is shown to be clamped between two portions of guide arm 44 and affixed in place with a screw 48. Bushing 46 may be any conventional bushing which may be affixed to a drill plate of or other appropriate structure. Many bushings are available to interact with different drill plates and a proper bushing may be chosen depending upon the application. A resilient member 45, which may be formed of any suitable material, may be affixed around bushing 46, and extend in front of bushing 46, to allow a press fit onto the workpiece. According to the present embodiment resilient member 45 is formed of a polymer material to reduce movement of the power tool assembly 10 during use. First piston rod 40, connection member 42 and guide arm 44 all slideably move within a casing or housing 50. It is to be understood that the embodiment described herein is merely exemplary, and as such, those skilled in the art will readily understand that the three portions, first piston rod 40, connection member 42, and guide arm 44 may all be one piece. Furthermore, connections between the various portions may be by any suitable means. Double acting air cylinder 36 may engage housing 50 either indirectly or directly, as through a secondary threading housing 52. Furthermore, the double acting air cylinder 36, guide arm 44, and bushing 46 are oriented generally in line with one another. Furthermore, not only are the separate components inline with one another, but in the same general plane over casing 18 of drill motor 14. This alignment assists in reducing binding and increasing accuracy of tool bit 26 into a work piece (described herein). Forces are linear as opposed to being applied off center or out of line. The incidence of binding and maintenance due to misalignment is reduced. Due to the reduced binding and increased accuracy tool maintenance is greatly reduced.

Power feed attachment 12 also includes a control system 56 including a hydraulic cylinder 58 having a front end 58a with a front portion 59 of a second piston rod 60 extending therefrom. Control system 56 also includes a variable connection or attachment 62 that couples second piston rod 60 to guide arm 44. Hydraulic cylinder 58 may be any suitable hydraulic cylinder such as a Slimline Kineschek Feed Control Part No. 1002-31-1 manufactured by Deschner Corporation. Front portion 59 of piston rod 60 engages guide arm 44 through variable attachment 62. Variable attachment 62 includes a threaded bore 63 which receives front portion 59 of second piston rod 60. Front portion 59 of second piston rod 60 engages a set screw 64. Set screw 64 is received in threaded bore 63 and may be adjusted in and out of threaded bore 63 to adjust the effective length of second piston rod 60. A nut 66 engages set screw 64 and acts as a jamb nut against variable attachment 62 to hold set screw 64 at the desired position. A rear side 67 of variable attachment 62 engages nut 66 forming a datum surface. As described herein, when power feed attachment 12 is activated, guide arm 44 is drawn towards chuck 24 in the direction of Arrow A. As also described herein, control system 56 controls the rate of movement of guide arm 44 by engaging variable attachment 62 with set screw 64. Set screw 64 may be adjusted rearwardly or forwardly in threaded bore 63 to adjust the distance of retraction depending upon the application in which the power tool assembly 10 will be used. An adjustment screw 68 allows a varying resistance to be produced by hydraulic cylinder 58. Adjustment screw 68 allows resistance produced by hydraulic cylinder 58 to be adjusted so that rate of the retraction of power feed attachment 12 may be precisely controlled.

Affixed next to housing 50 of the power feed attachment 12 is a valve 72. Valve 72 may be any suitable 2-position valve with a spring return such as an Eagle 4-way Valve Part No. E4-1PS00-000 manufactured by the Clippard Instrument Laboratory, Inc. Valve 72 includes a first inlet 74 and a second inlet 76 while also including a first outlet 78 and a second outlet 80. A first inlet line 82 connects the male coupling 28 through a first bore 84 created therein, to first inlet 74. First inlet line 82 may be affixed to first bore 84 through any suitable means capable of being sealed to the fluid. A second inlet line 86 connects a second bore 88 formed in motor casing 18 to second inlet 76. Second bore 88 in motor casing 18 is drilled through the outside cast wall of motor casing 18. Second bore 88 reaches an internal cavity (not shown) that becomes pressurized when trigger 20 is pressed. Again, second inlet line 86 may be affixed to second bore 88 through any suitable means that is substantially sealed to the fluid. A first outlet drive line 90 connects first outlet 78 and a rear portion 91 of double acting air cylinder 36. A second outlet drive line 92 connects a front portion 36a of double acting air cylinder 36 to second outlet 80. First outlet drive line 90 provides fluid to a first side 38a of air driven air driven piston 38 while second outlet drive line 92 provides fluid to a second side 38b of air driven air driven piston 38.

Power feed attachment 12 may be affixed to drill motor 14 through any suitable means. As an example, yoke or clamp portion 94 extends from housing 50 and wraps around motor casing 18 and is held in place by a screw 96. Any other means, however, may affix power feed attachment 12 to drill motor 14 making power feed attachment 12 a universal attachment to any suitable tool.

Figure 2:
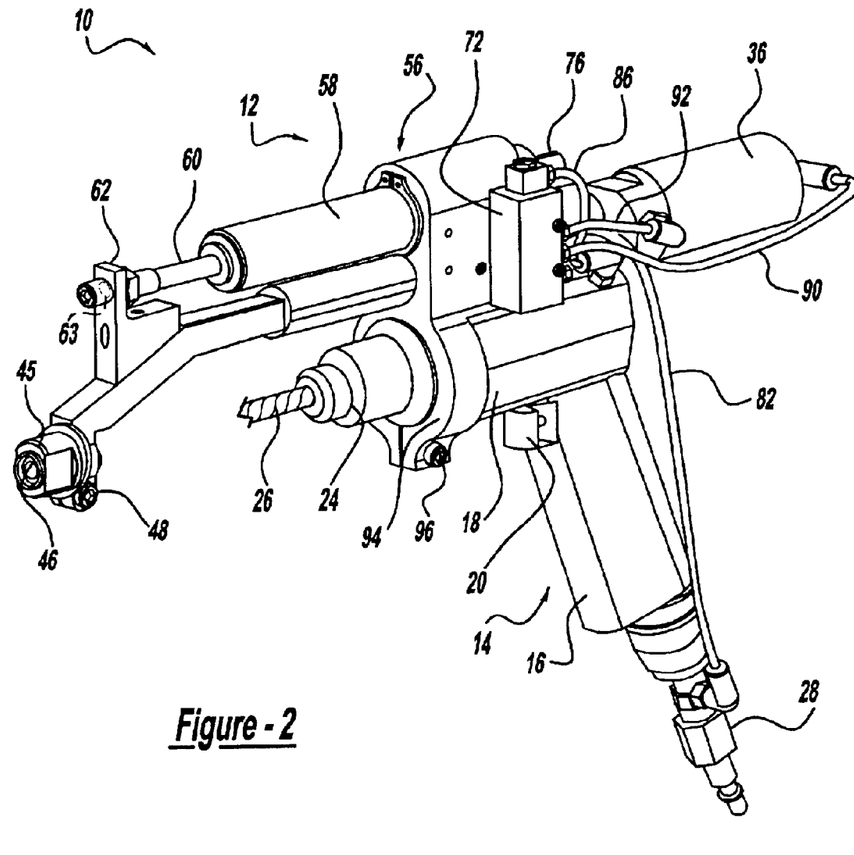
FIG. 2 is a front perspective view of the power tool of FIG. 1.
Figure 3:
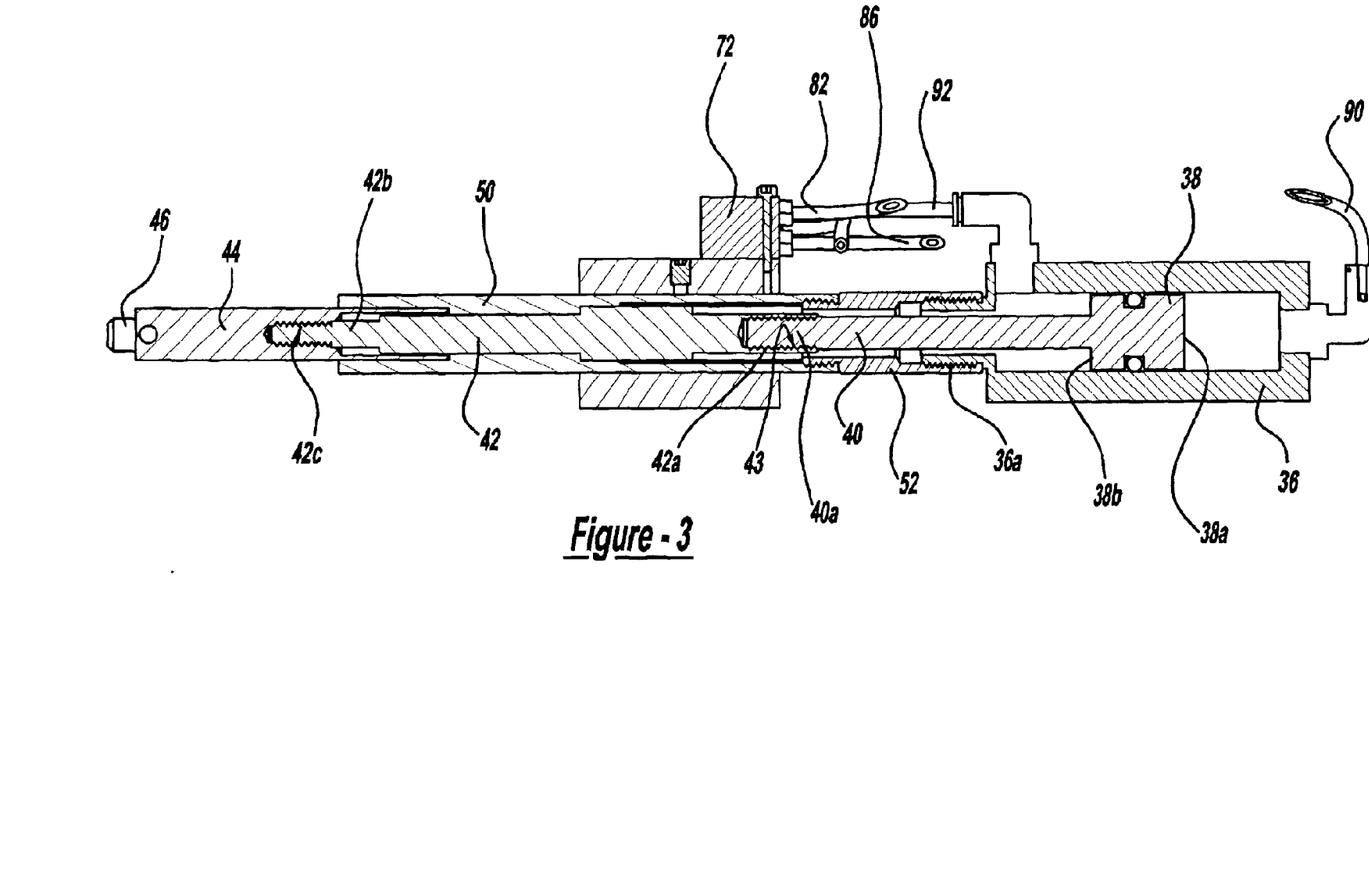
FIG. 3 is a cross-sectional view taken along line 3—3 of FIG. 1.

Drill motor 14 is a pneumatic powered drill. Pressurized air is received through male coupling 28 and then travels through the tool to power the motor to rotate chuck 24. Due to this fact, male coupling 28 is constantly powered or pressurized by the air coming from power source 33. Therefore, first inlet line 82 provides a constant source of pressurized air or power to valve 72 of power feed attachment 12. Valve 72 is biased in a first position by an internal biasing spring (not shown), allowing the constant pressure of air provided through first inlet line 82 to travel through valve 72 out first outlet drive line 90 to rear portion 36b of double acting air cylinder 36. Since this is the biased or normal position of valve 72, air is constantly supplied to the back of double acting air cylinder 36 therefore driving air driven piston 38 to an extended or forward position, as shown in FIGS. 1–3. In turn, this maintains guide arm 44 in a forward position, which is distal from chuck 24, and bushing 46 at a maximum allowable distance from chuck 24.

Figure 4:
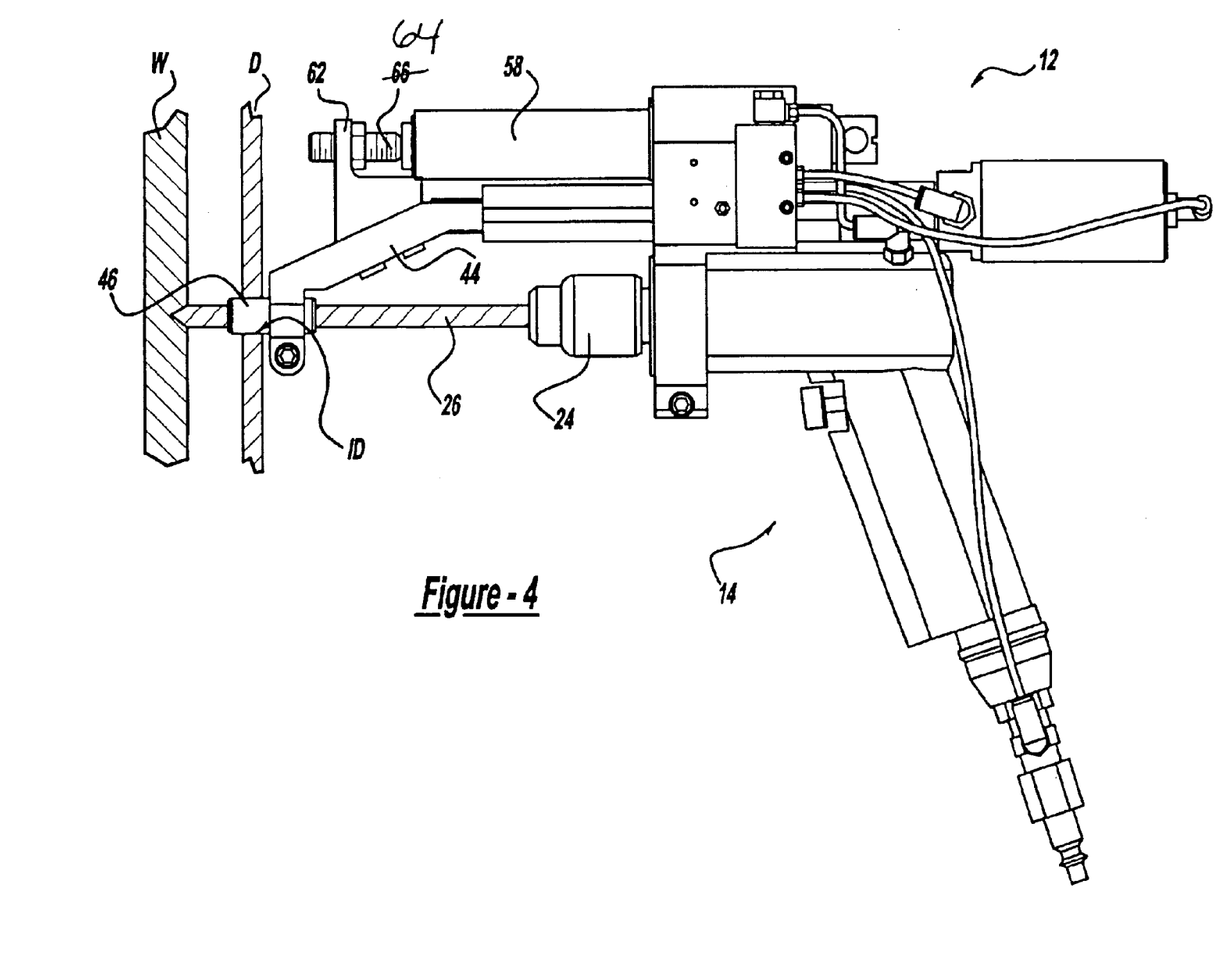
FIG. 4 is a side elevational view of the power tool of FIG. 1 illustrating the power tool engaged to a work piece and the power feed attachment disposed in a retracted position.

When an operator of the drill motor 14 presses trigger 20, air is then allowed to travel to motor casing 18 to power the motor. When air enters motor casing 18, air also pressurizes second inlet line 86 through second bore 88. Second bore 88 in the motor casing 18 allows air to travel out of motor casing to provide a signal to valve 72. The signal provided when trigger 20 is pressed moves valve 72 to a second position. In the second position, valve 72 transfers the pressurized air from power source 33 from first outlet drive line 90 to second outlet drive line 92. When this occurs, the second side 36b of double acting air cylinder 36 and also the second side 38b of air driven air driven piston 38 becomes pressurized driving air driven piston 38 in a second, rearward, or retracted position towards the rear portion 36a of double acting air cylinder 36 as shown in FIG. 4. Therefore, the activated position of the power tool assembly 10 is the retracted position as shown in FIG. 4. In particular, the retracted position moves bushing 46 in the direction of Arrow A to dispose bushing 46 nearer chuck 24. If power feed attachment 12 includes no controlling mechanisms the movement from the extended to the retracted position would be almost instantaneous. Since the air pressure is simply diverted from first side 38a to second side 38b of air driven piston 38 allowing guide arm 44 to retract toward chuck 24 as rapidly as the pressure of the air allows.

Control system 56 controls the rate of retraction of guide arm 44. In particular, hydraulic cylinder 58, of control system 56, provides hydraulic resistance through second piston rod 60 and variable attachment 62. As guide arm 44 is drawn towards chuck 24 guide arm 44 interacts with hydraulic cylinder 58. The resistance in hydraulic cylinder 58 controls the retraction of guide arm 44 towards chuck 24. Set screw 64 may also be adjusted to determine the distance of retraction of guide arm 44 towards chuck 24. Moving set screw 64 in threaded bore 63, changes the effective length of second piston rod 60. If set screw 64 is made to decrease the effective length of second piston rod 60 then there is less distance for the piston to travel in hydraulic cylinder 58 thereby decreasing the distance that guide arm 44 may travel. Additionally, adjustment screw 68 allows the resistance produced by hydraulic cylinder 58 of control system 56 to be adjusted. Increasing the resistance created by hydraulic cylinder 58, decreases the rate of the retraction of guide arm 44 towards chuck 24. Whereas, reducing the resistance of hydraulic cylinder 58 increases the retraction rate of guide arm 44 towards chuck 24. Various applications require differing rates of feed of bit 26 through the work piece W.

Adjustment of set screw 64 also allows for a precise depth of tool bit 26 into work piece W. Therefore, a continuous and easily repeated rate and depth of tool bit 26 into work piece W is reproduced by simply adjusting the set screw 64 and the adjustment screw 68 of power feed attachment 12.

Generally, the bushing 46 will be affixed to the work piece W by any appropriate means. In one embodiment, the outer diameter of the bushing 46 would mate substantially well with an inner diameter ID of a hole in an outer work piece or drill plate D thereby creating enough friction to hold power tool assembly 10 in a friction fit between the bushing 46 and drill plate D through which the tool bit 26 is to be driven. It is understood that drill motor 14 is driven towards the work piece W when guide arm 44 is retracted towards chuck 24. In this way, the precise depth and rate of the tool bit 26 into work piece W is obtained. Resilient member 45 may be used in place of the friction fit for a press fit attachment. Drill motor 14 is still drawn towards workpiece W, but is held in place by resilient member 45.

During the drilling operation the operator of the power tool assembly 10 moves the power tool assembly 10 through a feed cycle. The feed cycle includes an extended position to retracted position to extended position action. Power feed attachment 12 performs the entire cycle while the operator has to hold the drill motor 14 and operate trigger 20. Once guide arm 44 has retracted enough towards chuck 24, second piston rod 60 has reached a maximum retraction travel distance, bushing 46 and guide arm 44 stop the travel towards the retracted position. When the retracted motion has stopped the operator of the power tool assembly 10 releases trigger 20. When trigger 20 has been released motor casing 18 is no longer pressurized with air from power source 33. Therefore, second bore 88 is also not pressurized thus removing pressure from second inlet line 86 and allowing the spring in valve 72 to bias valve 72 in the first position. When valve 72 is biased in the first position, air from power source 33 travels through first inlet line 82 and out first outlet drive line 90 to pressurize first side 38a of air driven piston 38. This drives air driven piston 38 towards front portion 36a of double acting air cylinder 36 and drives guide arm 44 towards the extended position. In this way, double acting air cylinder 36 provides pneumatic power to move power feed attachment 12 between the retracted and extended positions. The pneumatic power provided by double acting air cylinder 36 helps insure that enough power is provided for extended usage and reduced maintenance or cleanings of the present invention. In particular, the pneumatic power provided to double acting air cylinder 36 provides enough power or force to overcome most general resistances which may form in double acting air cylinder 36 due to foreign materials entering the cylinder or foreign materials entering the housing 50.

The control system 56 also allows for an easily repeatable rate of retraction. Once the retraction rate has been set using hydraulic cylinder 58 and adjusting the resistance with adjustment screw 68 power tool assembly 10 will always advance to that rate that has been chosen. Therefore, power feed attachment 12 may be adjusted to provide a repeatable predetermined rate of retraction allowing that rate to be applied to the guide arm 44 to move power tool assembly 10. Additionally, the use of variable attachments 62 and second piston rod 60 allows for an easily repeatable depth of tool bit 26 into work piece W. Therefore, the operation of the power tool assembly 10 is easily repeatable without much control being necessary from an operator. For exemplary purposes only a repeatable countersink variance achieved was about 0.0015 inches in hole diameter and 0.007 inches in countersink diameter, when a counter sink was the tool bit 26 used. Also as an example, a Cp of about 1.61 has been achieved with this embodiment if a drill bit is chosen as the tool bit 26.

Figure 5:
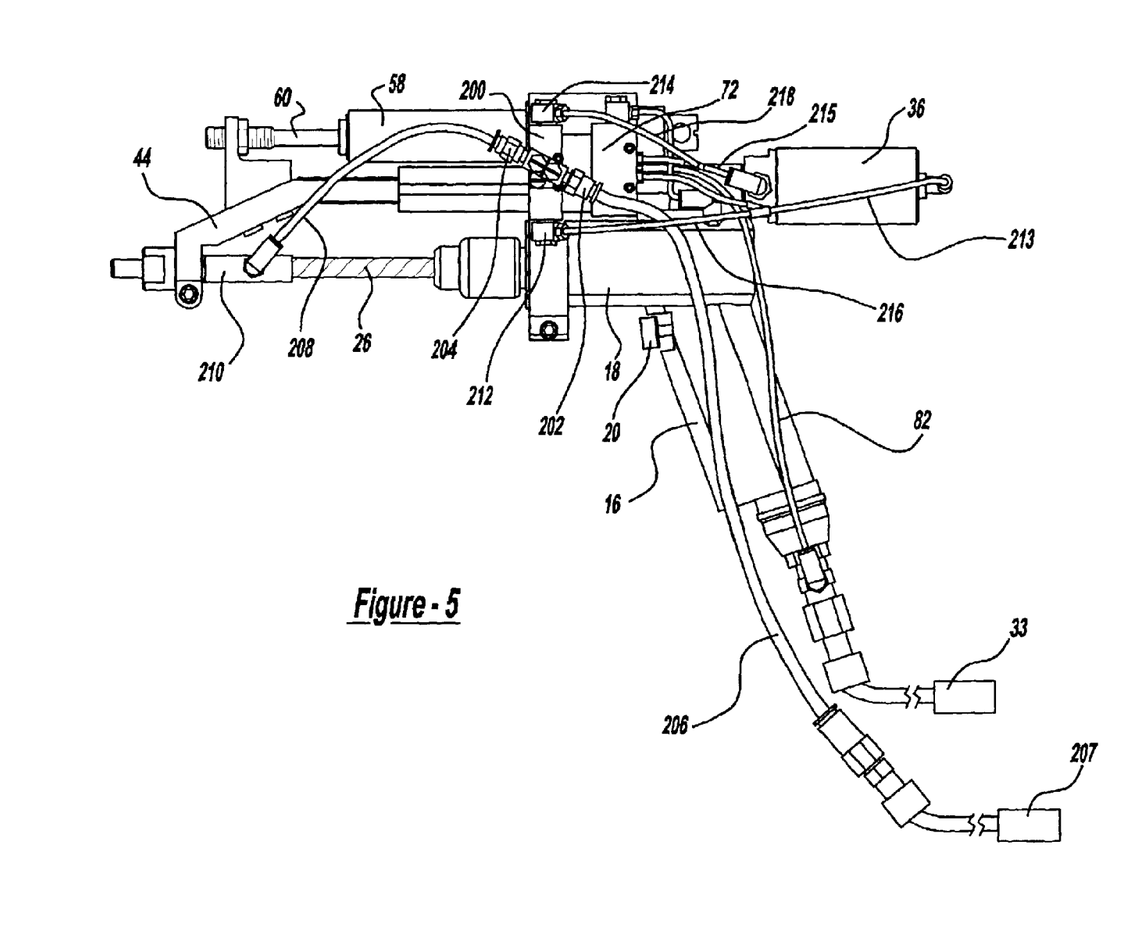
FIG. 5 is a side elevational view of a power tool having a power feed attachment constructed in accordance with the teachings of a second embodiment of the present invention.
Figure 6:
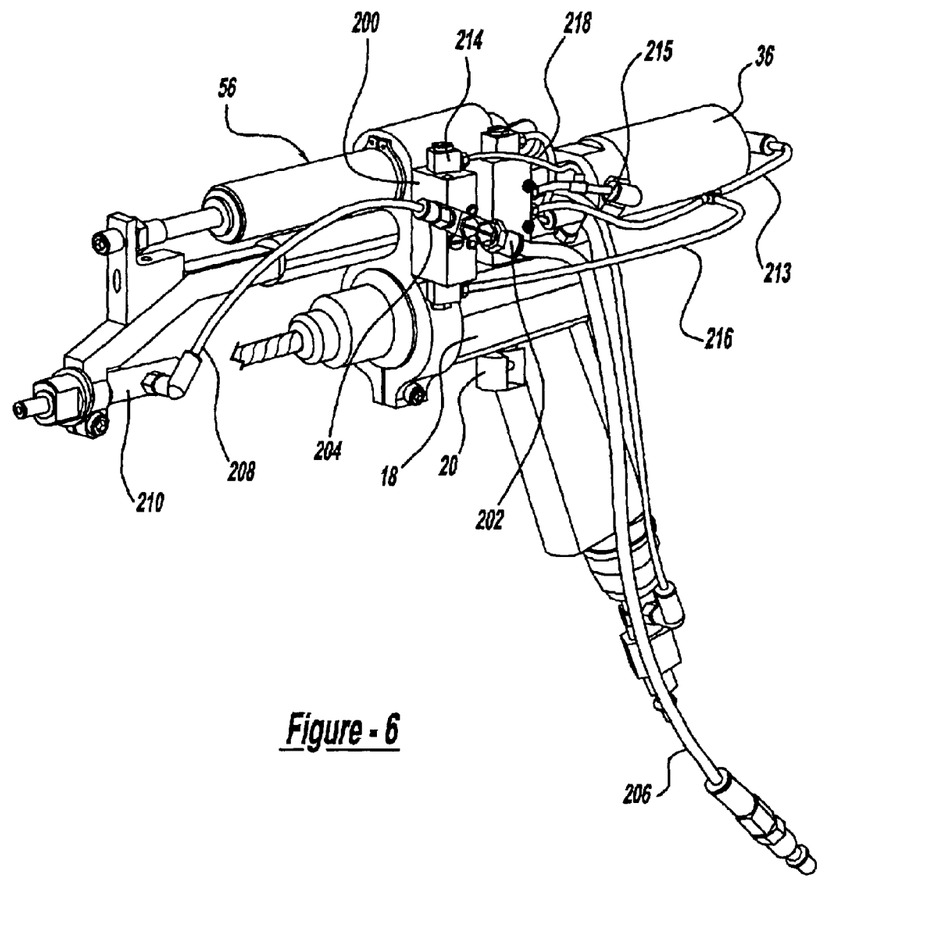
FIG. 6 is a front perspective view of the power tool of FIG. 5.

With reference to FIGS. 5 and 6, a second embodiment of the present invention is shown where like elements are given like numerals. The drill motor 14 and its associated parts are similar to those of the first embodiment discussed above, also similar portions of power feed attachment 12 will not be repeated. In the second embodiment, a coolant valve 200 is also included. The coolant valve 200 may be any appropriate 2-position valve but is preferably a pilot-operated valve, such as an Eagle 4-way valve, Part No. E4-1PP-00-000 manufactured by the Clippard Instrument Laboratory, Inc. Coolant valve 200 includes a coolant inlet 202 and a coolant outlet 204. A coolant inlet line 206 connects a coolant supply 207 and coolant inlet 202 of coolant valve 200. A coolant outlet line 208 connects coolant outlet 204 and a bushing 210. Bushing 210 is similar to bushing 46, discussed in relation to the first embodiment, except that it is able to receive coolant from the coolant outlet line 208 to provide cooling to the work piece or tool bit 26 during operation. In this way, harder materials may be drilled without overheating the work piece or tool bit 26 causing damage to both. Coolant valve 200 also includes a first power inlet 212 and a second power inlet 214. A first inlet line 216 operatively connects first power inlet 212 of valve 200 with first drive outlet line 213. A second inlet line 218 operatively interconnects second power inlet 214 with second drive outlet line 215.

Coolant valve 200 selectively allows coolant to flow from the coolant supply 207 to bushing 210 depending upon the state of drill motor 14. When drill motor 14 is not activated, first drive outlet line 213 is pressurized, as discussed above in relation to first drive outlet line 90. First inlet line 216 is also pressurized, biasing coolant valve 200 in a closed position so that coolant is not allowed to flow through coolant valve 200 to bushing 210. However, when drill motor 14 is activated, second drive outlet line 215 becomes pressurized, as discussed above in relation to second drive outlet line 92, causing coolant valve 200 to move to an open position to permit coolant to flow to bushing 210. Coolant is only allowed to flow through coolant valve 200 when drill motor 14 is activated and as such, a constant supply of coolant may be supplied to coolant valve 200 and to drill motor 14 for operation, without concerns for manually switching on and off a coolant flow. Advantageously, this ensures that a coolant flow is present when one is necessary.

Valve 200 is operated to move between both the open and the closed positions through pneumatic power provided by signals from drive outlet lines 213, 215. Coolant valve 200 is not spring biased in either direction. Coolant valve 200 is therefore able to overcome materials and coolant that may bind coolant valve 200 during normal operation. The power provided through inlets 212, 214 provide the power for switching the coolant valve 200 between the open and closed positions thus ensuring enough power for ease of operation is provided and to reduce repair or cleaning occurrence of coolant valve 200 to ensure proper operation. The mechanism of the second embodiment is otherwise identical to that described with the first embodiment in regards to the control of the rate and depth by which tool bit 26 is advanced toward a work piece.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power feed attachment for a hand held drill, the power feed attachment comprising:
   a coupling structure adapted for coupling the power feed attachment to the hand held drill;
   a double-acting cylinder having a housing, a piston and a rod, the housing being fixedly coupled to the coupling structure, the piston being disposed within the housing and movable between a first position and a second position, the rod being coupled for movement with the piston;
   a two-position valve assembly that is selectively operable in a first condition and a second condition, the two-position valve assembly being configured for directing a pressurized fluid to the double-acting cylinder wherein operation of the two-position valve assembly in the first condition operably directs the pressurized fluid to the piston such that the piston moves toward the first position and wherein operation of the two-position valve assembly in the second condition operably directs the pressurized fluid to the piston such that the piston moves toward the second position;

an arm coupled to the rod;

a control mechanism having a housing, which is fixedly coupled to the coupling structure, and a control rod, the control rod being movably within the housing of the control mechanism between an extended position and a retracted position, the control mechanism having a biasing device for biasing the control rod toward the extended position, the control rod being configured to contact the arm to resist movement of the piston toward the second position to thereby control a rate by which the piston is advanced toward the second position; and a bushing operably coupled to a distal end of the arm, the bushing having a through hole that is adapted for allowing a tool bit that is rotatably coupled to the hand held drill to pass therethrough.

2. The power feed attachment of claim 1, wherein the arm includes an arm structure and an adjustment mechanism, the arm structure being coupled to the rod, the adjustment mechanism having a datum surface that is selectively movable relative to the arm structure to permit a point at which the control rod is brought into contact with the arm to be controlled.

3. The power feed attachment of claim 2, wherein the adjustment mechanism includes a threaded member and a jam nut, the threaded member being threadably engaged to a threaded aperture in the arm structure, the jam nut being threadably engaged to the threaded member and abutting the arm structure to thereby prevent relative movement of the threaded member relative to the arm structure.

4. The power feed attachment of claim, 1 wherein the biasing device includes a metering mechanism and a fluid, the fluid being contained within the housing and being metered within the housing between a first compartment and a second compartment in response to movement of the control rod, the metering mechanism controlling a flow of the fluid into the first and second compartments.

5. The power feed attachment of claim 4, wherein the metering mechanism controls the flow of the fluid into the first compartment at a first rate and the flow of the fluid into the second compartment at a second rate that is relatively slower than the first rate such that the control rod can be positioned from the retracted position into the extended position relatively faster than the control rod can be positioned from the extended position into the retracted position.

6. The power feed attachment of claim 4, wherein the fluid is an oil-based fluid.

7. The power feed attachment of claim 4, wherein the metering mechanism is selectively adjustable.

8. For a power tool, a coolant system comprising:

a double-acting cylinder having a housing, a piston and a rod, the piston being disposed within the housing and movable between a first position and a second position, the rod being coupled for movement with the piston;

a coolant valve that is selectively operable in an inhibited condition and an enabled condition, the coolant valve being configured for controlling a flow of a pressurized coolant to the double-acting cylinder wherein placement of the coolant valve in the inhibited condition inhibits the flow of the pressurized coolant to the piston and wherein placement of the coolant valve in the enabled condition enables coolant to flow through the coolant valve to the piston;

a two-position valve assembly that is selectively operable in a first condition and a second condition, the two-position valve assembly being configured for directing a pressurized fluid to the double-acting cylinder wherein operation of the two-position valve assembly in the first condition operably directs the pressurized fluid to the piston such that the piston moves toward the first position and wherein operation of the two-position valve assembly in the second condition operably directs the pressurized fluid to the piston such that the piston moves toward the second position; and wherein the coolant valve is a pilot-operated directional valve, the coolant valve receiving a pilot signal from the two-position valve assembly that places the coolant valve in the enabled condition and wherein the pilot signal is generated when the two-position valve assembly is placed in the second condition.

9. The power feed attachment of claim 1, wherein the bushing includes a resilient bumper member that is adapted for contacting a work piece in a non-slip manner.

10. The power feed attachment of claim 1, further comprising a coolant valve that is selectively operable in an inhibited condition and an enabled condition, the coolant valve being configured for controlling a flow of a pressurized coolant wherein placement of the coolant valve in the inhibited condition inhibits the flow of the pressurized coolant and wherein placement of the coolant valve in the enabled condition enables coolant to flow through the coolant valve.

11. The power feed attachment of claim 10, wherein the coolant valve is a pilot-operated directional valve, the coolant valve receiving a pilot signal from the two-position valve assembly that places the coolant valve in the enabled condition and wherein the pilot signal is generated when the two-position valve assembly is placed in the second condition.

12. A power tool comprising:

a drill motor having a motor housing, a motor disposed within the motor housing and a trigger valve, the trigger valve being operable in an actuated condition for selectively providing the motor with a source of fluid power;

a double-acting cylinder having a housing, a piston and a rod, the housing being fixedly coupled to the motor housing, the piston being disposed within the housing and movable between a first position and a second position, the rod being coupled for movement with the piston;

a two-position valve assembly that is selectively operable in a first condition and a second condition, the two-position valve assembly being configured for directing a pressurized fluid to the double-acting cylinder wherein operation of the two-position valve assembly in the first condition operably directs the pressurized fluid to the piston such that the piston moves toward the first position and wherein operation of the two-position valve assembly in the second condition operably directs the pressurized fluid to the piston such that the piston moves toward the second position;

an arm coupled to the rod including an arm structure and an adjuster, the arm structure being coupled to the rod, the adjuster having a surface that is selectively movable relative to the arm structure to permit a point at which the control rod is brought into contact with the arm to be controlled; and a control mechanism having a housing, which is fixedly coupled to the coupling structure, and a control rod, the control rod being movable within the housing of the control mechanism between an extended position and a retracted position, the control mechanism having a biasing device for biasing the control rod toward the extended position, the control rod being configured to contact the arm to resist movement of the piston toward the second position to thereby control a rate by which the piston is advanced toward the second position;

wherein placement of the trigger valve in the actuated condition produces a signal that is the directed to the two-position valve assembly to place the two-position valve assembly in the second condition.

13. The power tool of claim 12, further comprising a coolant valve that is selectively operable in an inhibited condition and an enabled condition, the coolant valve being configured for controlling a flow of a pressurized coolant wherein placement of the coolant valve in the inhibited condition inhibits the flow of the pressurized coolant and wherein placement of the coolant valve in the enabled condition enables coolant to flow through the coolant valve.

14. The power tool of claim 12, wherein the adjustment mechanism includes a threaded member and a jam nut, the threaded member being threadably engaged to a threaded aperture in the arm structure, the jam nut being threadably engaged to the threaded member and abutting the arm structure to thereby prevent relative movement of the threaded member relative to the arm structure.

15. The power tool of claim 12, wherein the biasing device includes a metering mechanism and a fluid, the fluid being contained within the housing and being metered within the housing between a first compartment and a second compartment in response to movement of the control rod, the metering mechanism controlling a flow of the fluid into the first and second compartments.

16. The power tool of claim 15, wherein the metering mechanism controls the flow of the fluid into the first compartment at a first rate and the flow of the fluid into the second compartment at a second rate that is relatively slower than the first rate such that the control rod can be positioned from the retracted position into the extended position relatively faster than the control rod can be positioned from the extended position into the retracted position.

17. The power tool of claim 15, wherein the metering mechanism is selectively adjustable.

18. The power tool of claim 12, wherein a bushing is coupled to a distal end of the arm, the bushing having a through hole that is adapted for receiving a tool bit that is rotatably coupled to the hand held drill.

19. The power tool of claim 18, wherein the bushing includes a resilient bumper member that is adapted for contacting a work piece in a non-slip manner.

20. The power tool of claim 13, wherein the coolant valve is a pilot-operated directional valve, the coolant valve receiving a pilot signal from the two-position valve assembly that places the coolant valve in the enabled condition and wherein the pilot signal is generated when the two-position valve assembly is placed in the second condition.

* * * * *